US012593275B2

(12) United States Patent
Lo et al.

(10) Patent No.: US 12,593,275 B2
(45) Date of Patent: Mar. 31, 2026

(54) POWER SAVING METHOD FOR MONITORING DATA CHANNEL

(71) Applicant: MEDIATEK INC., Hsin-Chu (TW)

(72) Inventors: Yi-Chia Lo, Hsin-Chu (TW); Wei-De Wu, Hsin-Chu (TW); Yi-Ju Liao, Hsin-Chu (TW); Chi-Hsuan Hsieh, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 351 days.

(21) Appl. No.: 17/681,651

(22) Filed: Feb. 25, 2022

(65) Prior Publication Data

US 2022/0312316 A1     Sep. 29, 2022

Related U.S. Application Data

(60) Provisional application No. 63/165,750, filed on Mar. 25, 2021.

(51) Int. Cl.
*H04W 52/02* (2009.01)
*H04L 1/08* (2006.01)
(Continued)

(52) U.S. Cl.
CPC ........... *H04W 52/0216* (2013.01); *H04L 1/08* (2013.01); *H04L 1/1812* (2013.01);
(Continued)

(58) Field of Classification Search
CPC . H04W 76/27; H04W 76/28; H04W 52/0216; H04W 52/02; H04W 52/0235;
(Continued)

(56) References Cited

U.S. PATENT DOCUMENTS

2015/0063095 A1*  3/2015  Deng ................... H04W 8/005
                                                         370/221
2017/0280334 A1*  9/2017  Chou ................... H04B 17/318
                              (Continued)

FOREIGN PATENT DOCUMENTS

CN          101653024 A      2/2010
CN          108702706 A     10/2018
                (Continued)

OTHER PUBLICATIONS

Taiwan IPO, office action for the Taiwanese patent application 111110258 (no English translation is available), dated Oct. 4, 2022 (8 pages).

(Continued)

*Primary Examiner* — Quoc Thai N Vu
(74) *Attorney, Agent, or Firm* — Helen Mao; Zheng Jin; Imperium Patent Works

(57) ABSTRACT

A power saving method for monitoring data channel is proposed. The network node may indicate that the UE can enter a power saving mode by transmitting a DCI to the UE. The DCI may indicate a power saving duration and an additional monitoring duration. The power saving duration may indicate the length of the power saving mode and the starting point and the end point of the power saving mode. The additional monitoring duration may indicate that the UE needs to perform monitoring for a period of time before the power saving mode based on the first power saving duration indicated in the DCI.

16 Claims, 4 Drawing Sheets

(51) Int. Cl.

| | |
|---|---|
| *H04L 1/1812* | (2023.01) |
| *H04L 5/00* | (2006.01) |
| *H04W 72/1263* | (2023.01) |
| *H04W 72/23* | (2023.01) |

(52) U.S. Cl.
CPC ....... *H04L 5/0053* (2013.01); *H04W 52/0235* (2013.01); *H04W 72/1263* (2013.01); *H04W 72/23* (2023.01)

(58) Field of Classification Search
CPC . H04W 72/1263; H04W 72/20; H04W 72/23; H04W 72/232; H04W 52/0225; H04W 52/0229; H04W 52/288; H04L 1/08; H04L 1/1812; H04L 1/1819; H04L 5/0053; H04L 1/1851; H04L 1/1864; H04L 1/1883; H04L 1/1893
See application file for complete search history.

(56) References Cited

U.S. PATENT DOCUMENTS

| | | | |
|---|---|---|---|
| 2018/0368164 A1* | 12/2018 | Lunden | ................. H04W 76/28 |
| 2020/0351784 A1 | 11/2020 | Tsai et al. | |
| 2021/0037484 A1* | 2/2021 | Zhou | .................... H04L 1/1854 |
| 2022/0217635 A1* | 7/2022 | Lee | .................. H04W 72/0446 |

FOREIGN PATENT DOCUMENTS

| | | |
|---|---|---|
| CN | 109792690 A | 5/2019 |
| WO | WO 2016115739 A1 | 7/2016 |

OTHER PUBLICATIONS

China Intellectual Property Office Action 202210285308.X, dated Oct. 25, 2024.

* cited by examiner

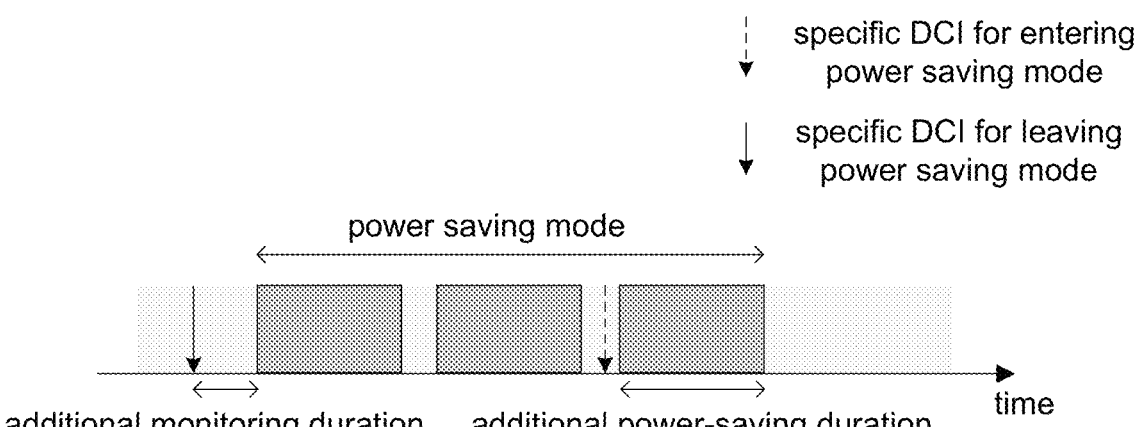

specific DCI for entering power saving mode specific DCI for leaving power saving mode power saving mode additional monitoring duration        additional power-saving duration        time

FIG. 5

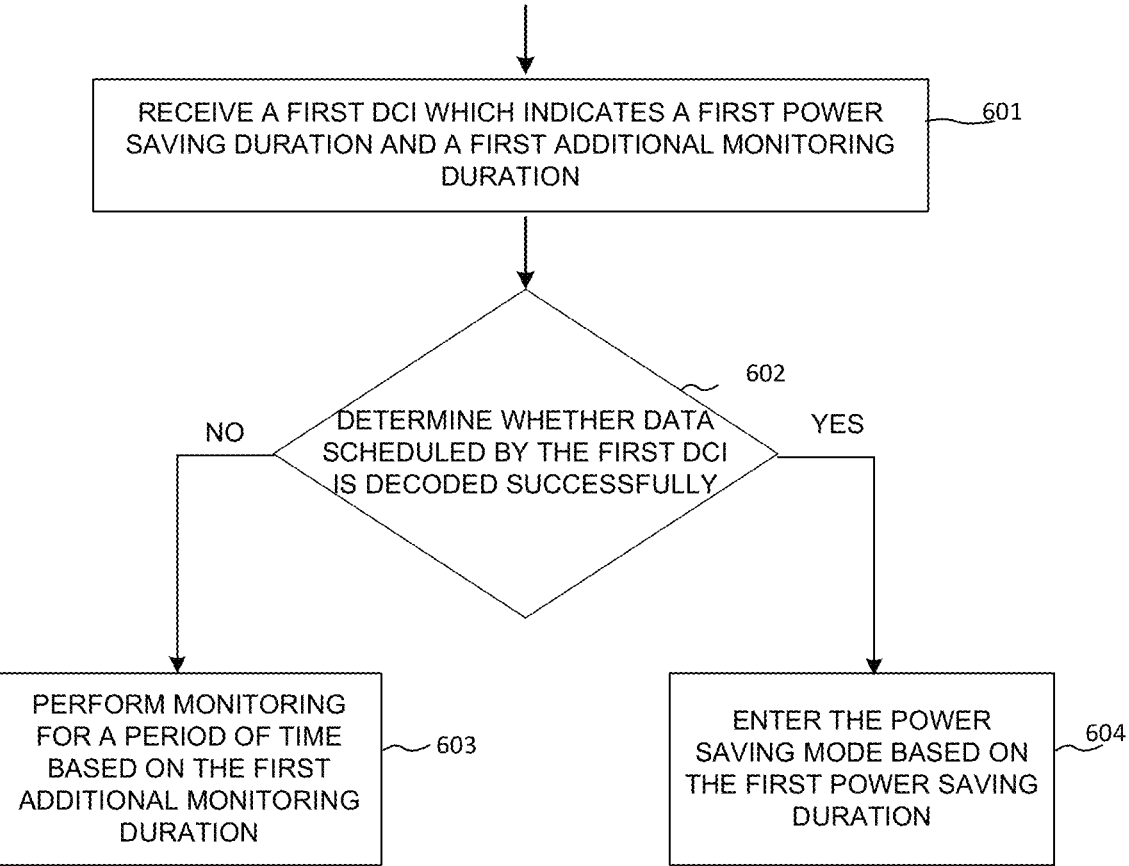

RECEIVE A FIRST DCI WHICH INDICATES A FIRST POWER SAVING DURATION AND A FIRST ADDITIONAL MONITORING DURATION ⎯601

DETERMINE WHETHER DATA SCHEDULED BY THE FIRST DCI IS DECODED SUCCESSFULLY ⎯602

NO

YES

PERFORM MONITORING FOR A PERIOD OF TIME BASED ON THE FIRST ADDITIONAL MONITORING DURATION ⎯603

ENTER THE POWER SAVING MODE BASED ON THE FIRST POWER SAVING DURATION ⎯604

FIG. 6

POWER SAVING METHOD FOR MONITORING DATA CHANNEL

CROSS REFERENCE TO RELATED APPLICATIONS

This application claims priority under 35 U.S.C. § 119 from U.S. Provisional Application No. 63/165,750, entitled "Condition Based Power Saving Enhancement," filed on Mar. 25, 2021, the subject matter of which is incorporated herein by reference.

TECHNICAL FIELD

The disclosed embodiments relate generally to wireless communication, and, more particularly, to power saving method for monitoring data channel.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board, has decided to focus the future NGMN activities on defining the end-to-end requirements for 5G new radio (NR) systems.

In conventional technology, when the network node may indicate that the UE can enter a power saving mode by transmitting a DCI to the UE. However, if the data scheduled by the DCI is not decoded by the UE successfully, the UE may still enter the power saving mode based on the DCI directly.

A solution is sought

SUMMARY

A power saving method for monitoring data channel is proposed. The network node may indicate that the UE can enter a power saving mode by transmitting a DCI to the UE. The DCI may indicate a power saving duration and an additional monitoring duration. The power saving duration may indicate the length of the power saving mode and the starting point and the end point of the power saving mode. The additional monitoring duration may indicate that the UE needs to perform monitoring for a period of time before the power saving mode based on the first power saving duration indicated in the DCI.

In one embodiment, a UE receives a first downlink control information (DCI) from a network node, wherein the first DCI indicates a first power saving duration and a first additional monitoring duration. The UE determines whether data in the first DCI is decoded successfully by the UE. In an event that the data scheduled by the first DCI is not decoded successfully, the UE performs monitoring for a period of time based on the first additional monitoring duration before a power saving mode based on the first power saving duration.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 illustrates an example of an additional monitoring duration and an additional power-saving duration.

FIG. 6 is a flow chart of a power saving method for monitoring data channel in accordance with one novel aspect.

DETAILED DESCRIPTION

Reference will now be made in detail to some embodiments of the invention, examples of which are illustrated in the accompanying drawings.

Figure 1:
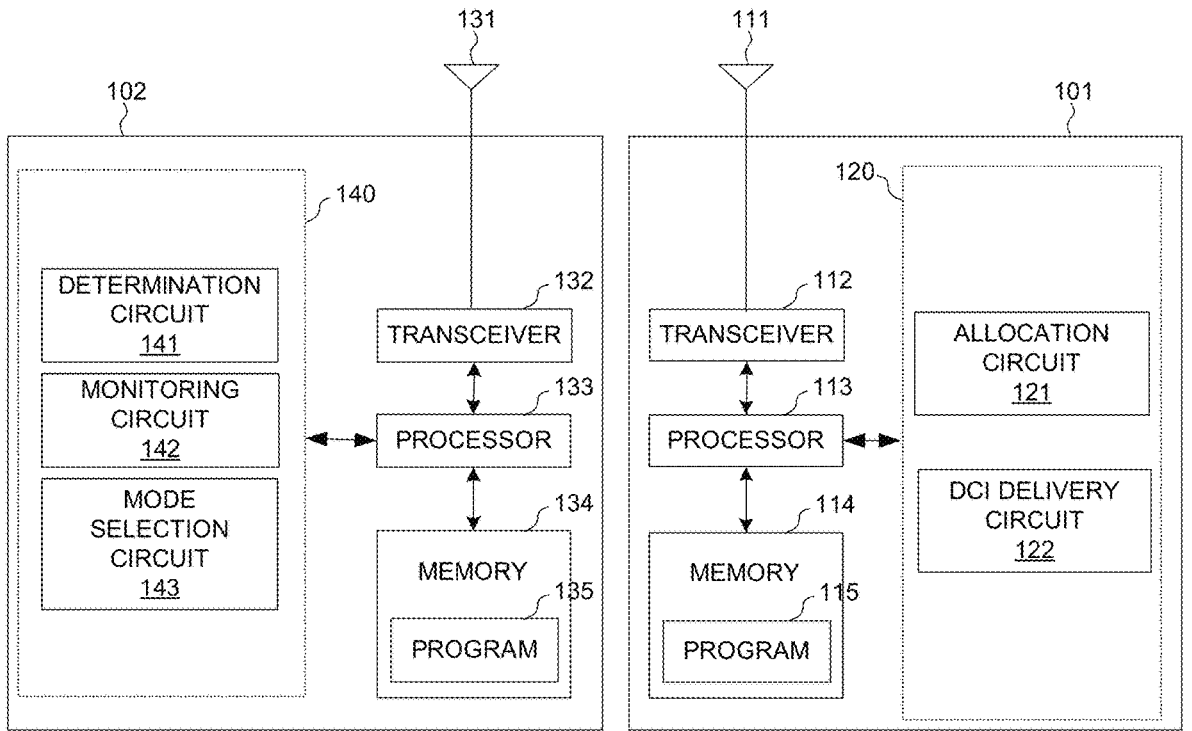
FIG. 1 is a simplified block diagram of a network node and a user equipment that carry out certain embodiments of the present invention.

FIG. 1 is a simplified block diagram of a network node and a user equipment (UE) that carry out certain embodiments of the present invention. The network node 101 may be a base station (BS) or a gNB, but the present invention should not be limited thereto. The UE 102 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

Network node 101 has an antenna array 111 having multiple antenna elements that transmits and receives radio signals, one or more RF transceiver modules 112, coupled with the antenna array, receives RF signals from antenna 111, converts them to baseband signal, and sends them to processor 113. RF transceiver 112 also converts received baseband signals from processor 113, converts them to RF signals, and sends out to antenna 111. Processor 113 processes the received baseband signals and invokes different functional modules and circuits 120 to perform features in network node 101. Memory 114 stores program instructions and data 115 to control the operations of network node 101. Network node 101 also includes multiple function modules that carry out different tasks in accordance with embodiments of the current invention.

Similarly, UE 102 has an antenna 131, which transmits and receives radio signals. A RF transceiver 132, coupled with the antenna, receives RF signals from antenna 131, converts them to baseband signals and sends them to processor 133. RF transceiver 132 also converts received baseband signals from processor 133, converts them to RF signals, and sends out to antenna 131. Processor 133 processes the received baseband signals and invokes different functional modules and circuits 140 to perform features in UE 102. Memory 134 stores program instructions and data 135 to control the operations of UE 102. UE 102 also includes multiple function modules and circuits that carry out different tasks in accordance with embodiments of the current invention.

The functional modules and circuits 120 and 140 can be implemented and configured by hardware, firmware, software, and any combination thereof. The function modules and circuits 120 and 140, when executed by the processors 113 and 133 (e.g., via executing program codes 115 and 135), allow network node 101 and UE 102 to perform embodiments of the present invention.

In the example of FIG. 1, the network node 101 may comprise an allocation circuit 121 and a downlink control information (DCI) delivery circuit 122. Allocation circuit 121 may determine to transmit normal DCI to the UE 102 or transmit specific DCI to the UE 102. DCI delivery circuit 122 may transmit the normal DCI or the specific DCI to the UE 102. In accordance with one novel aspect, compared with normal DCI, the specific DCI is regarded as a DCI which indicates PDCCH monitoring adaptation and the DCI is associated with an additional monitoring duration.

Similarly, the UE 102 may comprise a determination circuit 141, a monitoring circuit 142 and a mode selection circuit 143. Determination circuit 141 may determine whether data in the DCI is decoded successfully. Monitoring circuit 142 may monitor the data channel, e.g. Physical Downlink Control Channel (PDCCH). Mode selection circuit 143 may determine to enter a power saving mode based on a DCI.

In accordance with one novel aspect, the network node 101 may indicate that the UE 102 can enter a power saving mode by transmitting a specific DCI to the UE 102. In accordance with one novel aspect, the specific DCI may indicate a power saving duration and an additional monitoring duration. The power saving duration may indicate the length of the power saving mode and the starting point and the end point of the power saving mode. The starting point of the power saving mode is the slot the UE 102 receive the specific DCI. In embodiment, the power saving duration may be a continuous time duration. In another embodiment, the power saving duration may comprise several periodical time durations. The additional monitoring duration may indicate that the UE 102 needs to perform monitoring for a period of time before the power saving mode based on the power saving duration indicated in the specific DCI.

In accordance with one novel aspect, when the UE 102 receives the specific DCI from the network node 101, the UE 102 may determine whether the specific DCI is decoded successfully, e.g. whether the Hybrid Automatic Repeat Request (HARQ) processing outcome is valid. In an embodiment, for downlink transmission, when the HARQ processing outcome is valid, the UE 102 may transmit a HARQ ACK to the network node 101. That is to say, when the UE 102 transmits a HARQ ACK to the network node 101, the UE 102 may determine the specific DCI is decoded successfully.

In an event that the data scheduled by the specific DCI is not decoded successfully (e.g. HARQ processing outcome is not valid), the UE 102 may need to perform monitoring the data channel (e.g. PDCCH) for a period of time based on the additional monitoring duration indicated in the specific DCI. During the additional monitoring duration, the UE 102 may determine whether a new indication (e.g. a new DCI) is scheduled by the network node 101. If the UE 102 receives a new indication from the network node 101 during the additional monitoring duration, the UE 102 may perform following operations based on information of the new indication. If the UE 102 does not receive a new indication from the network node 101 during the additional monitoring duration, the UE 102 may enter the power saving mode based on the power saving duration indicated in the specific DCI. In accordance with another novel aspect, when the HARQ processing outcome is unknown or uncertain (e.g. for uplink transmission), the UE 102 may also need to perform monitoring the data channel (e.g. PDCCH) for a period of time based on the additional monitoring duration indicated in the specific DCI.

In accordance with one novel aspect, the additional monitoring duration may be counted by a timer. When the timer has been expired and the UE 102 does not receive a new indication from the network node 101, the UE 102 may enter the power saving mode based on the power saving duration indicated in the specific DCI.

In an event that the data scheduled by the specific DCI is decoded successfully (e.g. HARQ processing outcome is valid), the UE 102 may enter the power saving mode based on the power saving duration indicated in the specific DCI.

Figure 2A:
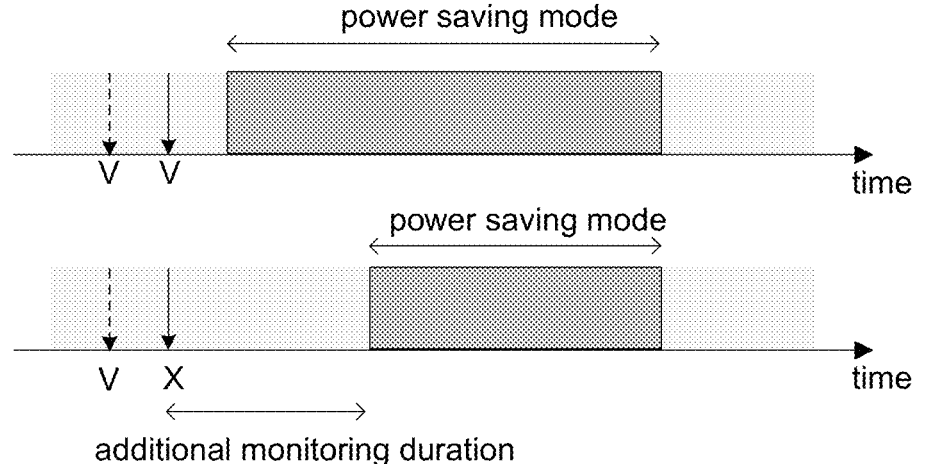
FIG. 2A illustrates an example of a power saving duration and an additional monitoring duration.
Figure 2B:
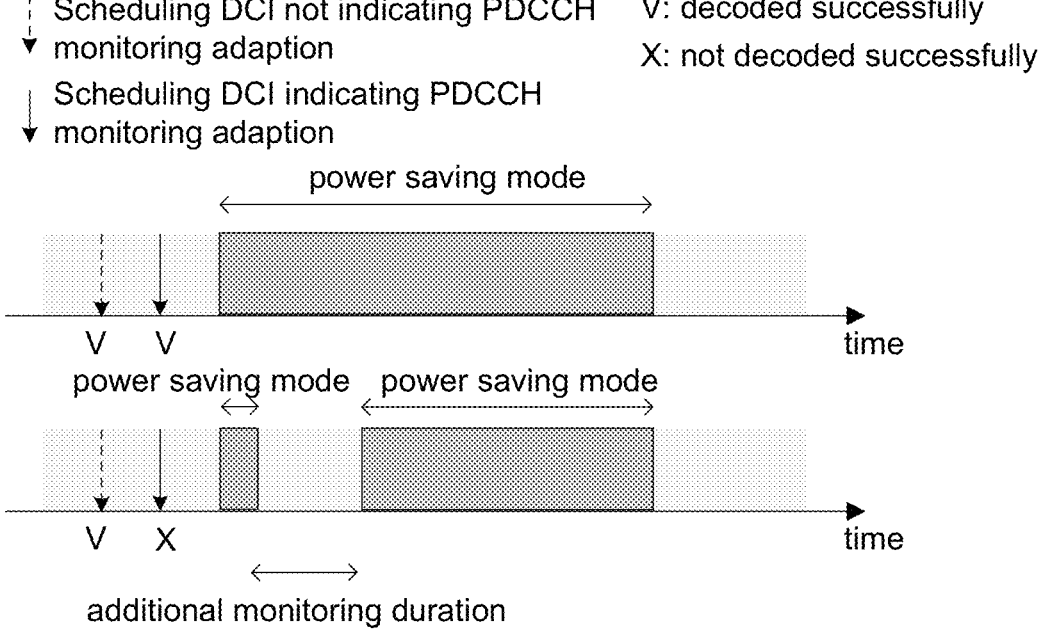
FIG. 2B illustrates another example of a power saving duration and an additional monitoring duration.

FIG. 2A illustrates an example of a power saving duration and an additional monitoring duration. As shown in FIG. 2A, if the data scheduled by the specific DCI (i.e. the DCI indicates PDCCH monitoring adaptation) is decoded successfully (e.g. HARQ processing outcome is valid), the UE 102 may enter the power saving mode based on the power saving duration indicated in the specific DCI. If the specific DCI is not decoded successfully (e.g. HARQ processing outcome is not valid), before the UE 102 enters the power saving mode based on the power saving duration indicated in the specific DCI, the UE 102 may need to perform monitoring the data channel (e.g. PDCCH) for a period of time based on the additional monitoring duration indicated in the specific DCI. FIG. 2B illustrates another example of a power saving duration and an additional monitoring duration. As shown in FIG. 2B, UE enters the power saving mode first. If the specific DCI is not decoded successfully (e.g. HARQ processing outcome is not valid), the UE 102 may need to perform monitoring the data channel (e.g. PDCCH) for a period of time based on the additional monitoring duration indicated in the specific DCI. Then, the UE 102 may enter the power saving mode based on the power saving duration indicated in the specific DCI.

In accordance with one novel aspect, the UE 102 may receive two specific DCIs (e.g. a first specific DCI and a second specific DCI) with different types respectively. In an example, the first specific DCI is for uplink transmission (e.g. a UL grant) and the second specific DCI is for downlink transmission (e.g. a DL grant). In another example, the first specific DCI is for downlink transmission (e.g. a DL grant) and the second specific DCI is for uplink transmission (e.g. a UL grant). The first specific DCI may indicate a first power saving duration and a first additional monitoring duration and the second specific DCI may indicate a second power saving duration and a second additional monitoring duration. The first additional monitoring duration and the second additional monitoring duration are configured based on the same configuration rules. For downlink transmission, the additional monitoring duration (e.g. the first additional monitoring duration and the second additional monitoring duration) may be configured to be the sum of drx-HARQ-RTT-TimerDL duration and drx-RetransmissionTimerDL duration. The UE 102 may be not required to perform monitoring during the portion of time corresponding to drx-HARQ-RTT-TimerDL duration. For uplink transmission, the additional monitoring duration (e.g. the first additional monitoring duration and the second additional monitoring duration) may be configured to be the sum of drx-HARQ-RTT-TimerUL duration and drx-RetransmissionTimerUL duration. The UE 102 may be not required to perform monitoring during the portion of time corresponding to drx-HARQ-RTT-TimerUL duration.

Figure 3:
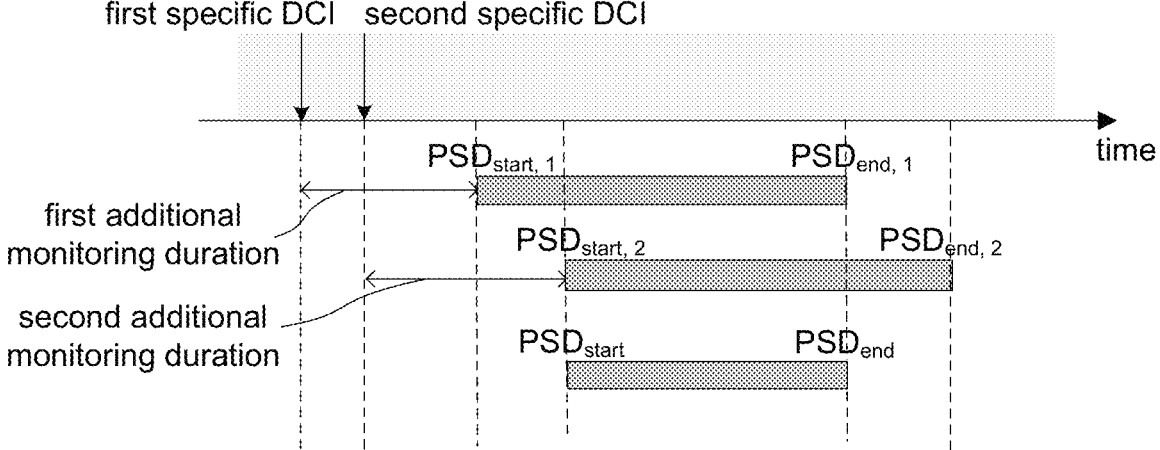
FIG. 3 illustrates an example of two specific DCIs with different types.

In accordance with an embodiment, when the UE 102 receives two specific DCIs (e.g. a first specific DCI and a second specific DCI) with different types respectively, the UE 102 may determine a duration of the power saving mode based on the overlapped time duration of the first power saving duration and the second power saving duration. FIG. 3 illustrates an example of two specific DCIs with different types. The UE 102 receives a first specific DCI. The first specific DCI may indicate a first power saving duration from $PSD_{start,\ 1}$ to $PSD_{end,\ 1}$. Then, the UE 102 receives a second specific DCI before entering the power saving mode based on the first power saving duration. The second specific DCI may indicate a second power saving duration from $PSD_{start,\ 2}$ to $PSD_{end,\ 2}$. Therefore, the UE 102 may determine a duration of the power saving mode based on the overlapped time duration of the first power saving duration and the second power saving duration. That is to say, the duration of the power saving mode is from $PSD_{start,\ 2}$ to $PSD_{end,\ 1}$.

Figure 4:
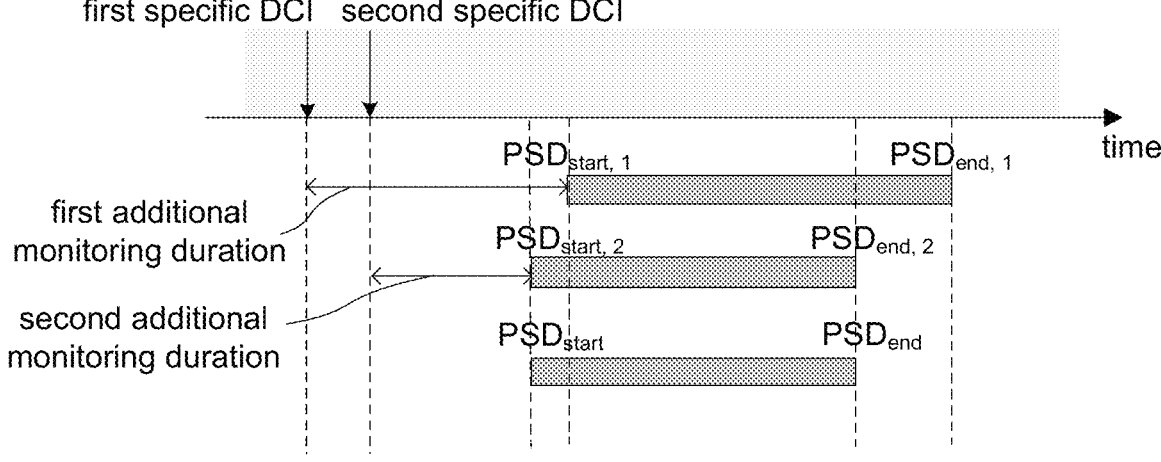
FIG. 4 illustrates another example of two specific DCIs with different types.

In accordance with another embodiment, when the UE 102 may receive two specific DCIs (e.g. a first specific DCI (i.e. an early specific DCI) and a second specific DCI (i.e. a late specific DCI)) with different types respectively, the UE 102 may determine a duration of the power saving mode based on the second power saving duration indicated by the latest specific DCI (i.e. second specific DCI). FIG. 4 illustrates another example of two specific DCIs with different types. The UE 102 receives a first specific DCI (i.e. early specific DCI). The first specific DCI may indicate a first power saving duration from $PSD_{start,\ 1}$ to $PSD_{end,\ 1}$. Then, the UE 102 receives a second specific DCI (i.e. a late specific DCI) before entering the power saving mode based on the first power saving duration. The second specific DCI may indicate a second power saving duration from $PSD_{start,\ 2}$ to $PSD_{end,\ 2}$. Therefore, the UE 102 may determine a duration of the power saving mode based on the second power saving duration indicated by the latest specific DCI (i.e. second specific DCI). That is to say, the duration of the power saving mode is from $PSD_{start,\ 2}$ to $PSD_{end,\ 2}$.

In accordance with one novel aspect, the UE 102 may stay in the power saving mode until receiving an indication for leaving the power saving mode from the network node 101 or the UE may leave the power saving mode after the end of the power saving duration indicated by the specific DCI. In accordance with one novel aspect, if the connected Discontinuous Reception (c-DRX) is configured by the network node 101, the UE 102 can be configured to return data channel monitoring mode at every long cycle start.

In accordance with one novel aspect, the UE 102 may maintain the power saving mode for a period of time based on an additional power-saving duration before leaving the power saving mode. In accordance with one novel aspect, the additional power-saving duration may be longer than the additional monitoring duration. In an embodiment, the additional power-saving duration is obtained based on the additional monitoring duration. For example, the length of the additional power-saving duration may be the length of the additional monitoring duration plus a time unit, wherein the time unit may be symbol, slot, and so on. In another embodiment, the additional power-saving duration is indicated in a DCI. FIG. 5 illustrates an example of an additional monitoring duration and an additional power-saving duration. The network node 101 may transmit a specific DCI for entering power saving mode to the UE 102 and transmit a specific DCI for leaving power saving mode to the UE 102. The length of the additional power-saving duration indicated in the specific DCI for leaving power saving mode may be longer than the additional monitoring duration indicated in the specific DCI for entering power saving mode.

FIG. 6 is a flow chart of a power saving method for monitoring data channel in accordance with one novel aspect. In step 601, the UE 102 receives a first downlink control information (DCI) from the network node 101, wherein the first DCI indicates a first power saving duration and a first additional monitoring duration. In step 602, the UE 102 determines whether data in the first DCI is decoded successfully.

In step 603, if the data scheduled by the first DCI is not determined to be decoded successfully, the UE 102 performs monitoring for a period of time based on the first additional monitoring duration before a power saving mode based on the first power saving duration. In step 604, if the data scheduled by the first DCI is decoded successfully, the UE 102 enters the power saving mode based on the first power saving duration.

In accordance with one novel aspect, in the power saving method, the UE 102 may receive a second DCI from the network node 101 before entering the power saving mode based on the first power saving duration, wherein the second DCI indicates a second power saving duration and a second additional monitoring duration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:

receiving a first downlink control information (DCI) by a user equipment (UE) from a network node, wherein the first DCI indicates a first power saving duration and a first additional monitoring duration;

determining whether data scheduled by the first DCI is decoded successfully;

performing monitoring for a period of time based on the first power saving duration such that the first power saving duration is shortened based on the first additional monitoring duration before a power saving mode, in an event that the data scheduled by the first DCI is not determined to be decoded successfully;

receiving a second DCI by the UE from the network node before entering the power saving mode based on the first power saving duration, wherein the second DCI indicates a second power saving duration and a second additional monitoring duration; and determining a duration of the power saving mode based on an overlapped time duration of the first power saving duration and the second power saving duration.

2. The method of claim 1, further comprising:

performing the power saving mode based on the first power saving duration if the data scheduled by the first DCI is determined to be decoded successfully.

3. The method of claim 1, further comprising:

determining whether data scheduled by the first DCI is decoded successfully or not based on whether HARQ ACK is transmitted from UE or not.

4. The method of claim 1, wherein the first additional monitoring duration is configured to be a sum of drx-HARQ-RTT-TimerDL duration and drx-Retransmission TimerDL duration for downlink transmission.

5. The method of claim 1, wherein the first additional monitoring duration is configured to be a sum of drx-HARQ-RTT-TimerUL duration and drx-Retransmission TimerUL duration for uplink transmission.

6. The method of claim 1, further comprising:

determining a duration of the power saving mode based on the second power saving duration.

7. The method of claim 1, wherein the UE stays in the power saving mode until receiving an indication for leaving the power saving mode.

8. The method of claim 1, wherein the UE leaves the power saving mode after the end of the first power saving duration.

9. A user equipment (UE), comprising:

a receiver, receiving a first downlink control information (DCI) from a network node, wherein the first DCI indicates a first power saving duration and a first additional monitoring duration; and a processor, determining whether data scheduled by the first DCI is decoded successfully;

wherein the processor performs monitoring for a period of time based on the first power saving duration such that the first power saving duration is shortened based on the first additional monitoring duration before a power saving mode, in an event that the data scheduled by the first DCI is not determined to be decoded successfully; receives a second DCI by the UE from the network node before entering the power saving mode based on the first power saving duration, wherein the second DCI indicates a second power saving duration and a second additional monitoring duration; and determines a duration of the power saving mode based on an overlapped time duration of the first power saving duration and the second power saving duration.

10. The UE of claim 9, wherein the UE performs the power saving mode based on the first power saving duration if the data scheduled by the first DCI is determined to be decoded successfully.

11. The UE of claim 9, wherein the UE determines whether data scheduled by the first DCI is decoded successfully or not based on whether HARQ ACK is transmitted from it.

12. The UE of claim 9, wherein the first additional monitoring duration is configured to be a sum of drx-HARQ-RTT-TimerDL duration and drx-Retransmission TimerDL duration for downlink transmission.

13. The UE of claim 9, wherein the first additional monitoring duration is configured to be a sum of drx-HARQ-RTT-TimerUL duration and drx-Retransmission TimerUL duration for uplink transmission.

14. The UE of claim 9, wherein the processor determines a duration of the power saving mode based on the second power saving duration.

15. The UE of claim 9, wherein the UE stays in the power saving mode until receiving an indication for leaving the power saving mode.

16. The UE of claim 9, wherein the UE leaves the power saving mode after the end of the first power saving duration.

* * * * *